United States Patent [19]

Kohler et al.

[11] 3,987,236

[45] Oct. 19, 1976

[54] ARRANGEMENT ON ELECTRIC INDUCTION FURNACES FOR THE DETERMINATION OF THE FILLING LEVEL OF THE LIQUID MELTING MATERIAL

[75] Inventors: Henning Kohler, Dabringhausen; Karl-Ludwig Morkramer, Remscheid-Lennep, both of Germany; Spyridion Christou, Thespie-Thewe-Wiotias, Greece

[73] Assignee: AEG-Elotherm G.m.b.H., Remscheid, Germany

[22] Filed: June 2, 1975

[21] Appl. No.: 582,972

[30] Foreign Application Priority Data

May 31, 1975 Germany............................ 2426356

[52] U.S. Cl................................. 13/26; 219/10.77
[51] Int. Cl.² ........................................ H05B 5/00
[58] Field of Search........................... 13/26, 27, 13; 219/10.75, 10.77

[56] References Cited
UNITED STATES PATENTS

| | | | |
|---|---|---|---|
| 3,185,811 | 5/1965 | Kasper et al. | 13/26 X |
| 3,185,894 | 5/1965 | Beckius | 13/27 X |
| 3,331,909 | 7/1967 | Kasper | 13/27 |
| 3,622,678 | 11/1971 | Allen | 13/13 |
| 3,917,896 | 11/1975 | Nakagawa et al. | 13/27 |

Primary Examiner—R. N. Enval, Jr.
Attorney, Agent, or Firm—Cushman, Darby & Cushman

[57] ABSTRACT

The invention is an improved detector system for determining and indicating the level of a molten charge within a furnace. The system can determine the level of the charge without the need for having contacts or other sensing devices within the furnace by sensing impedance changes in the furnace's heating coils.

5 Claims, 1 Drawing Figure

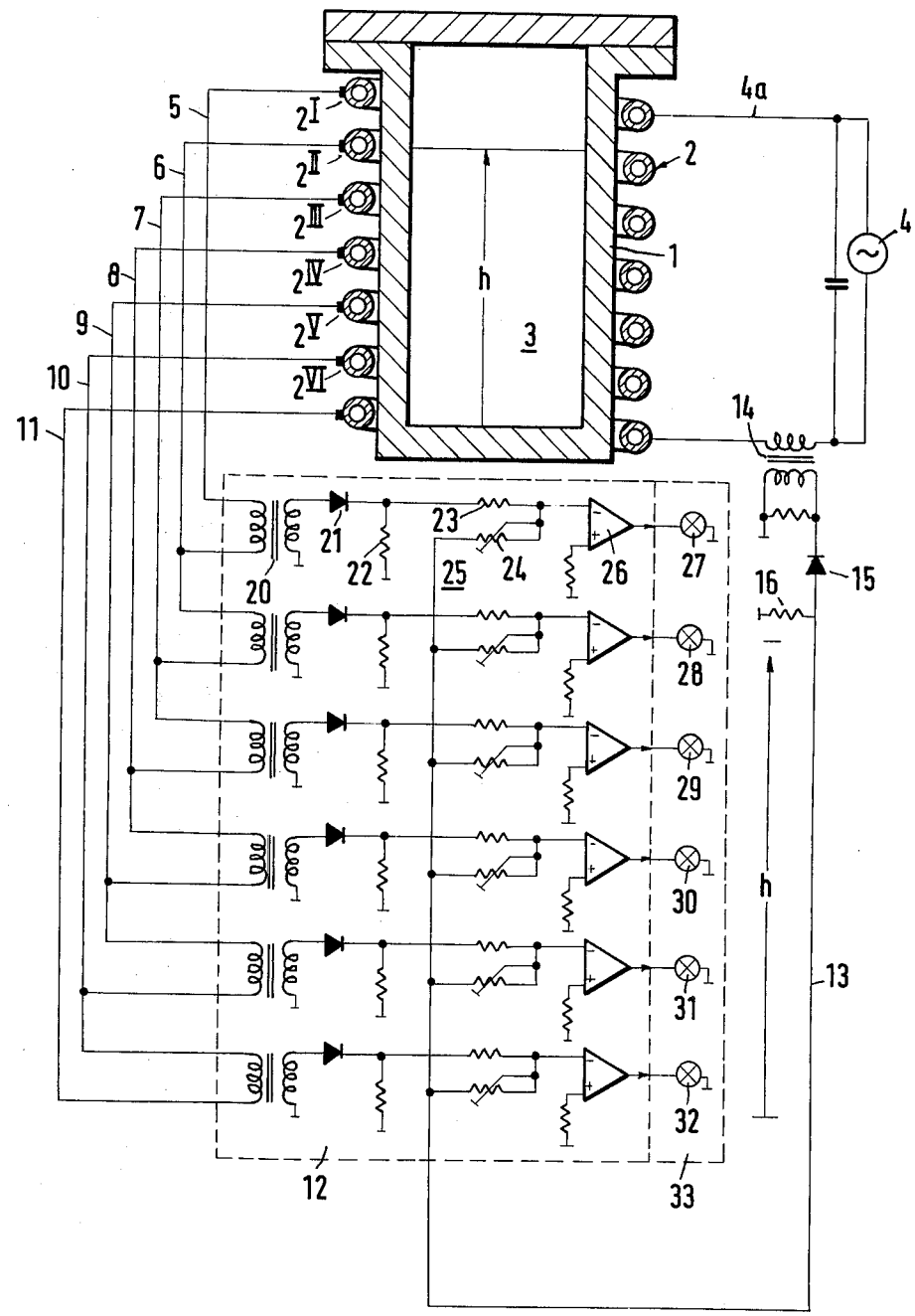

ARRANGEMENT ON ELECTRIC INDUCTION FURNACES FOR THE DETERMINATION OF THE FILLING LEVEL OF THE LIQUID MELTING MATERIAL

For the determination of the filling level of the liquid melting material on electric induction furnaces which serve for the melting of melting materials with a low melting point, it has already been proposed to dispose a metallic signaling contact made of material with a high melting point on the inside wall of the furnace pot at a predetermined filling level, and to connect said contact with a supply of current (power), the pertinent flow path of the current of which is closed by way of the liquid melt whenever the melt reaches the filling level of the signal contact. This arrangement in the case of melts with a low melting point and with a multiplication of the provided signal contacts which are disposed or distributed along the filling level of the furnace pot, can also be used for the purpose of making a measurement of the filling state running step by step, which will be sufficiently exact up to the distance between two signal contacts.

These and other arrangements, however, suffer from the disadvantage that the electrically conductive contacts which are inserted into the wall of the pot will likewise by heated inductively in the case of furnaces in operation, as a result of which particular difficulties develop for the selection of the material for these contacts. Beyond that, such arrangements are not suitable for the measurement of the filling level on induction furnaces which serve for the melting of materials with a high melting point. Special signal contacts which are water-cooled are required on such furnaces and the entire arrangement becomes costly and wasteful solely as a result of the insertion of the required contacts.

The invention deals with the task of giving a largely wear-resistant arrangement, operating largely uninfluenced by the furnace temperature, for the determination of the filling level of the liquid melting material in the furnace pot of electric induction furnaces which will at least permit the operator to determine the reaching or exceeding of a predetermined filling level in a perfect manner without the assistance of optical aids.

The invention furthermore deals with the task of measuring the level of the melting material in the inside of electric induction furnaces without a contact. The measurement in the case of furnaces in operation is to be possible while avoiding parts subject to wear at high temperature of the melting charge (material).

The arrangement according to the invention has the advantage that no additional measuring means etc. of any kind need to be provided on the pot of the induction furnace beside the customary induction coil which heats the melting charge for the purpose of measuring the filling level. The heating coil of the furnace respectively its coils, which encircle (encompass) the melting charge in the furnace along the filling level, can be provided at any arbitrary level of filling with tappings between one winding of the coil or a group of windings of the coil which is assigned to the pertinent filling level, so that the reduction in tension at this part of the assigned coil can be tapped or measured and used for the control of the detector provided.

The attached drawing shows a partial cross-sectional view of a preferred embodiment by way of example on the basis of a schematic presentation.

In the presentation, the number 1 designates the pot of an induction melting furnace, which is used, for example, for the melting of steel scrap. The induction coil 2, which heats the melting charge 3 in the inside of the pot 1, is connected to an A.C. current supply 4 and is disposed with its windings along the filling level $h$ encompassing the pot 1. The individual windings of the coil are disposed superposed along the filling level $h$ and are water-cooled in the customary manner by way of a centric recess.

The coil 2 has a series of tappings $2^I$, $2^{II}$, $2^{III}$, $2^{IV}$, $2^V$, $2^{VI}$, which penetrate the insulation of the coil conductor and which are disposed in such a way that always two locally adjacent tappings enclose one or more full windings of the coil.

The tappings are connected by way of assigned electric wires 5, 6, 7, 8, 9, 10 and 11 with the corresponding inlets of an electric detector arrangement 12 to which is fed at the same time by way of the line 13 a measuring signal proportional to the A.C. current passing through the coil 2.

For this purpose, the primary winding of a current converter 14 is inserted into the line 4a between the A.C. current generator 4 and the connections of the coil 2, the secondary winding of which converter is connected with the resistance 16 by way of a rectifier 15. D.C. current flows by way of the resistance 16 which is proportional to the strength of the A.C. current by way of the line 4a.

Between the lines 5 and 6, a voltage difference can be measured, which is proportional to the winding voltage of the induction coil 2 between the connections $2^I$ and $2^{II}$. The introductions are connected with the primary winding of a repeating coil 20, the secondary winding of which is connected with the resistance 22 by way of the rectifier 21. The voltage drops as the resistances 16 and 22 are compared with one another for equality in a comparator circuit containing the two resistances 23 and 24, the resistance 24 of which is adjustable. Whenever the two voltages are equal, then no modulation of the following switch amplifier 26 does occur. Whenever deviations from the proportionality between the current flow through the coil 2 and the voltage drop between the coil tappings $2^I$ and $2^{II}$ occur, then the occurring differential voltage at the inlet of the amplifier 26 fully modulates said amplifier, and the amplifier 26 operates an optic signaling arrangement 27 in the form of a light diode.

Deviations from the proportionality between current and voltage will always occur as a result of the entry of the liquid charge 3 into the coil opening which changes the coil impedance at the monitored part of the coil 2. In this case, a more or less sudden (jerky) change of the coil impedance occurs, which is indicated by a lighting up of the signal 27. The lighting up of the lighting arrangement 27 therefore indicates the corresponding level of the charge 3.

The correspondingly tapped parts of the induction coil 2 operate additional light sources 28, 29, 30, 31 and 32 always assigned to them by way of similarly developed detector arrangements which light sources together with the light source 27 are disposed on a signaling panel 33 corresponding to their assigned level on the furnace pot along a vertical direction.

Therefore, the operator is in a position by observing the light signals on the signaling panel 33 to control the level of the charge on the pot 1 continuously.

As a result of the development of the detector arrangements 25, 26, 27 as a coil impedance monitory arrangement, the measurement of the level on the furnace pot becomes independent of the wattage which is fed to the furnace. For this purpose it is, however, also possible in deviation from the described embodiment given by way of example, to accomplish the measurement of the filling level always by engagement with the A.C. current generator 4 in the case of a constant coil current by way of the line 4a.

Moreover, in the case of the measurement, attention must be paid to the fact that the melting charge 3 in the furnace 1 is fully and thoroughly melted and has no solid enclosures whatever.

The invention is not limited to the embodiment described and given by way of example. It can be used for the measurement of the filling level in all customary induction furnaces which are equipped with one or more induction coils or parts of such induction coils disposed distributed along the filler level that is to be monitored.

What is claimed is:

1. In an induction furnace having a pot for containing an electrically conductive substance and a plurality of windings with taps encircling said pot, a level sensor comprising means for detecting the voltage difference between first and second taps of said windings and means for providing an indication of filler level as a function of said voltage differential.

2. In a furnace as in claim 1, a level sensor wherein said detecting means includes means for tapping a plurality of said windings, means connected to tappings of adjacent windings for producing an electrical voltage signal which varies as a function of the voltage difference between said adjacent tappings, means for detecting the current in said windings and producing an electrical current signal which varies as a function thereof, and means for comparing said current signal with each of said voltage signals to produce a plurality of level signals each indicating whether said substance has reached the level of the adjacent windings which produced that voltage signal.

3. In a furnace as in claim 2 wherein said level sensor further includes means for indicating said level signal.

4. In a furnace as in claim 3 wherein said indicating means comprises a light diode.

5. In a furnace as in claim 1 wherein said windings form at least part of an induction coil for heating said substance.

* * * * *